United States Patent [19]

Edwards, deceased et al.

[11] Patent Number: 4,581,137
[45] Date of Patent: Apr. 8, 1986

[54] GAS DIFFUSER TUBE ASSEMBLY

[75] Inventors: Richard N. Edwards, deceased, late of Raleigh, N.C., by Katherine E. Edwards, co-executor; by Richard N. Edwards, Jr., co-executor, Charlotte, N.C.

[73] Assignee: Ozonics Corporation, Gaithersburg, Md.

[21] Appl. No.: 662,702

[22] Filed: Oct. 19, 1984

[51] Int. Cl.⁴ .......................... C02F 3/20; A01G 27/00
[52] U.S. Cl. ..................... 210/220; 261/122; 261/124; 261/DIG. 70; 239/145; 239/547
[58] Field of Search ................. 261/65, 122, DIG. 70, 261/124; 210/199, 220; 239/145, 547

[56] References Cited

U.S. PATENT DOCUMENTS

| | | |
|---|---|---|
| 1,792,285 | 2/1931 | Curry et al. |
| 1,792,286 | 2/1931 | Curry et al. |
| 3,063,689 | 11/1962 | Coppock ............................ 261/124 |
| 3,186,644 | 6/1965 | Ross et al. .................. 261/DIG. 70 |
| 3,206,178 | 9/1965 | Lamb ................................ 261/122 |
| 3,432,154 | 3/1969 | Danjes ............................... 261/122 |
| 3,490,752 | 1/1970 | Danjes et al. ...................... 261/122 |
| 3,525,685 | 9/1970 | Edwards ......................... 210/220 X |
| 3,642,260 | 2/1972 | Danjes et al. ...................... 261/122 |
| 3,677,936 | 7/1972 | Bastiannse ..................... 261/124 X |
| 3,772,188 | 11/1973 | Edwards ........................ 210/199 X |
| 3,857,910 | 12/1973 | Day ................................. 210/199 X |
| 3,880,965 | 4/1975 | Dudis et al. ........................ 261/122 |
| 3,988,396 | 10/1976 | Stannard ............................ 261/124 |
| 3,997,606 | 8/1976 | Wyss ............................. 261/122 X |
| 4,029,581 | 6/1977 | Clough, Jr. et al. ................ 210/220 |
| 4,060,486 | 11/1977 | Schreiber ............................ 210/220 |
| 4,118,447 | 10/1978 | Richter ............................... 261/122 |
| 4,165,286 | 8/1979 | Schreiber et al. ............. 261/122 X |
| 4,177,226 | 12/1979 | Danel .................................. 261/124 |

Primary Examiner—Thomas Wyse
Attorney, Agent, or Firm—Bell, Seltzer, Park & Gibson

[57] ABSTRACT

An improved gas diffuser tube assembly, particularly for diffusing bubbles of oxygen gas into liquid sewage during treatment thereof, is provided. The assembly is characterized by a construction which creates substantially the smallest bubbles that would be operationally practical and which satisfactorily prevents back flow of liquid into the diffuser assembly by including the following. An inner support tube has apertures extending radially therethrough in a bottom portion thereof for passing gas from the inside to the outside thereof. A flexible membrane surrounds the support tube and has a plurality of minute punctures extending therethrough and located in an upper section thereof for receiving the gas which passes between the support tube and the membrane and discharging the gas under pressure out of the membrane sheath in the form of fine streams of tiny bubbles of the gas. The unpunctured portion of the membrane sheath will seal the apertures in the support tube against any back flow of liquid into the support tube even if nonrecoverable stretching has occurred in the membrane sheath.

14 Claims, 12 Drawing Figures

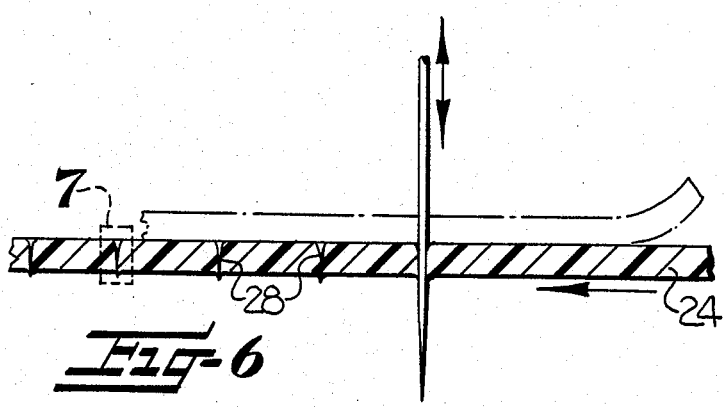
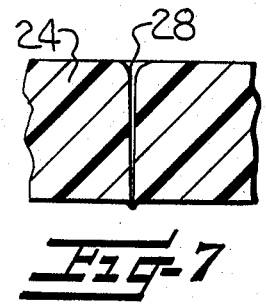
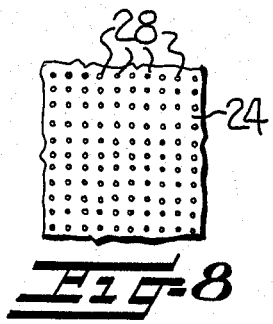
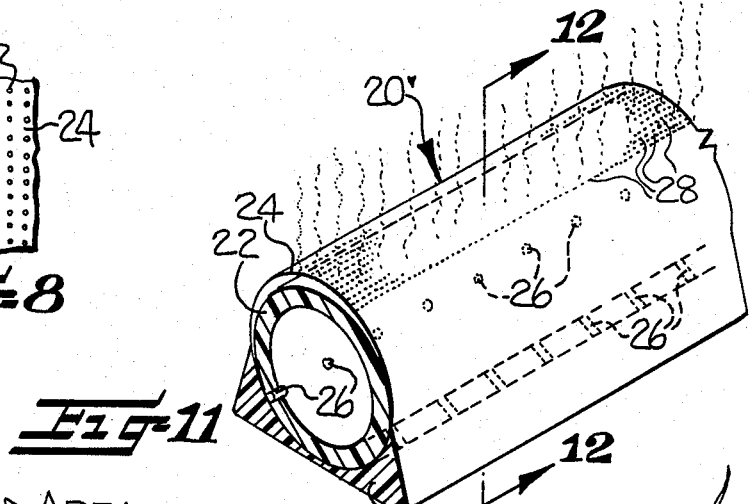
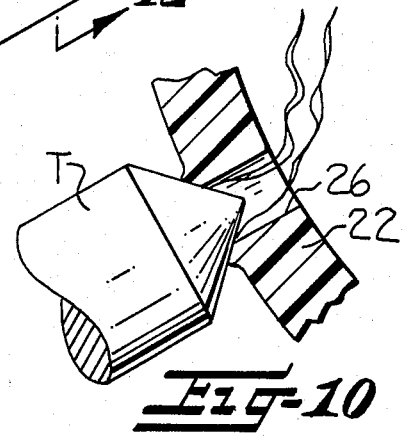
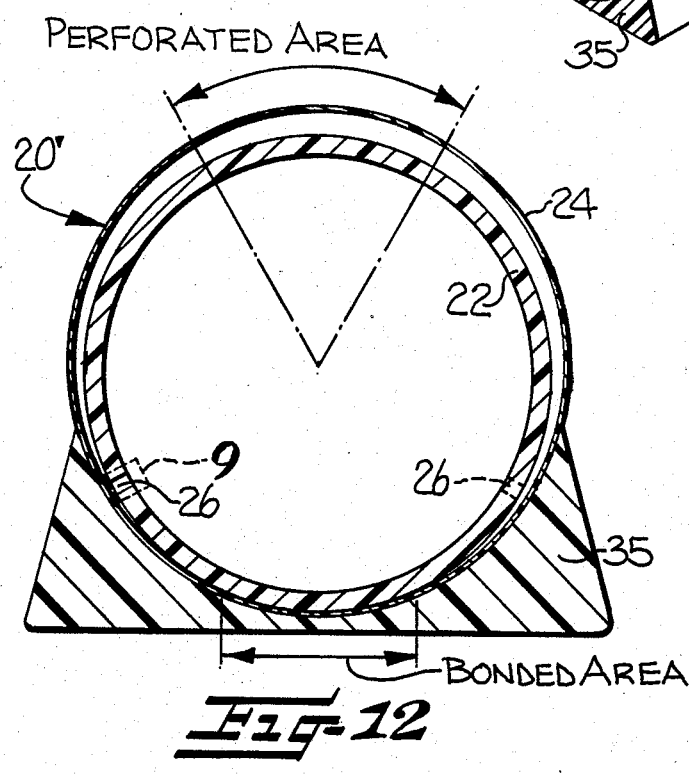
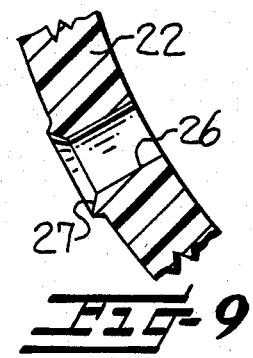

GAS DIFFUSER TUBE ASSEMBLY

FIELD OF THE INVENTION

This invention relates to a gas diffuser tube assembly, particularly for diffusing bubbles of oxygen gas into liquid sewage during treatment thereof, and characterized by a construction which creates substantially the smallest bubbles that would be operationally practical and which satisfactorily prevents back flow of liquid into the diffuser assembly.

BACKGROUND OF THE INVENTION

Gas diffuser tube assemblies are utilized in a number of environments for being submerged within a liquid to receive and discharge gas under pressure in the form of bubbles into the liquid for diffusion of the gas into the liquid.

In applicant's prior U.S. Pat. No. 3,525,685, issued Aug. 25, 1970, such a gas diffuser tube assembly was disclosed for being positioned within a sewage and waste water conduit which transported sewage and waste water from a point of collection to a point of treatment. The diffuser tube assembly discharged bubbles of oxygen gas under pressure into the liquid sewage and waste water for chemically treating such liquid sewage and waste water prior to its delivery to a treatment facility.

Also, in applicant's prior U.S. Pat. No. 3,772,188, issued Nov. 13, 1973, gas diffuser devices were utilized to diffuse bubbles of oxygen gas into liquid sewage and waste being treated in an enclosed pressurized vessel for chemical treatment thereof by a process now known commercially as "OXYOZOSYNTHESIS". The term "oxygen" as used in such patent and as used herein includes both $O_2$ and $O_3$ and thus generically includes ozone.

When treating a liquid with a gas by diffusing a gas, such as oxygen, into a liquid, such as waste water and sewage, it has been recognized that the greater the area of interface between the liquid and the gas, the greater the amount of gas will be dissolved into the liquid per unit volume of gas and liquid under set temperatures and pressures. Also, the more bubbles that can be created per unit volume of gas, the greater the interface area becomes between the liquid and the gas.

It has further been generally recognized that diffuser tube assemblies which are submerged within a liquid for diffusing gas into the liquid must include means for preventing back flow of the liquid into the diffuser tube assembly, if the pressure of the liquid exceeds that of the gas within the diffuser tube assembly.

Notwithstanding the above, diffuser tube assemblies heretofore proposed, particularly for use in treatment of liquid sewage with oxygen, have suffered from one or more problems or drawbacks with the creation of the greatest area of interface between the liquid and the gas and in preventing back flow of the liquid into the diffuser tube assembly and have thereby adversely affected the chemical treatment of the liquid sewage.

OBJECT AND SUMMARY OF THE INVENTION

Accordingly, it is the object of this invention to provide an improved gas diffuser tube assembly which will create an increased area of interface between the liquid and the gas by producing the smallest bubbles of gas that would be operationally practical and which is constructed to satisfactorily prevent back flow of liquid into the gas diffuser tube assembly.

By this invention, it has been found that the above object may be accomplished by providing a diffuser tube assembly which includes the following general construction.

An enclosed elongate inner support tube is provided which has a circular cross-sectional shape and which is adapted for receiving therewithin the gas under pressure to be diffused and for being submerged in a generally horizontal position in the liquid into which the gas is to be diffused. A flexible membrane sheath of a material which is generally impervious to the gas being diffused and the liquid into which the gas is being diffused is positioned around and surrounds the outside surface of the support tube.

Apertures are formed to extend radially through the support tube and are located longitudinally along the support tube in a lower section of the support tube below a horizontal plane passing through the support tube along the longitudinal axis thereof for passing the gas under pressure to be diffused from within the support tube into the interior of the flexible membrane sheath to flow upwardly between the support tube and the membrane sheath while slightly stretching the membrane sheath. A plurality of minute punctures extend through the membrane sheath and are located longitudinally along the membrane sheath in an upper section of the membrane sheath above the apertures in the support tube for discharging the gas under pressure out of the membrane sheath and into the liquid. Such punctures in the membrane sheath are preferably needle punctured from the inside thereof to the outside thereof without removal of any material therefrom, while slightly deforming the material surrounding the punctures from the inside to the outside thereof, to aid in passage of the gas therethrough and to cause vibrations of the deformed material on the outside thereof during passage of the gas through the punctures to aid in preventing clogging of the punctures by particles which may be present in the liquid.

By the above construction of a gas diffuser tube assembly, fine streams of tiny bubbles of the gas will be discharged into the liquid for diffusion and will create an increased area of interface between the gas and the liquid. Also, the membrane sheath will seal the apertures in the support tube against any back flow of the liquid into the support tube even if some non-recoverable stretching has occurred in the membrane sheath due to the passage of the gas since such stretching will occur in the membrane sheath above the apertures.

BRIEF DESCRIPTION OF THE DRAWINGS

FIG. 6 is a sectional detail through a membrane sheath of the diffuser tube assembly of this invention illustrating particularly punctures through such membrane sheath and formation thereof by needle punching;

FIG. 7 is an enlarged sectional detail taken generally within the box 7 of FIG. 6;

FIG. 8 is a sectional detail of the inside surface of the membrane sheath showing a typical pattern of punctures therein;

FIG. 9 is a sectional detail taken generally within the box 9 of FIGS. 4 and 12 showing an aperture through a support tube of the diffuser tube and shoulder portions around the outside of such aperture, FIG. 10 is a sectional detail showing the formation of the shoulder portions around the outside of the aperture in the support tube as shown in FIG. 9, FIG. 11 is a partial perspective view of a slightly modified form of diffuser tube assembly constructed in accordance with this invention; and FIG. 12 is an enlarged cross-sectional view of the diffuser tube assembly of FIG. 11 and taken generally along the line 12—12 of FIG. 11.

DETAILED DESCRIPTION OF PREFERRED EMBODIMENTS OF THE INVENTION

Figure 1:
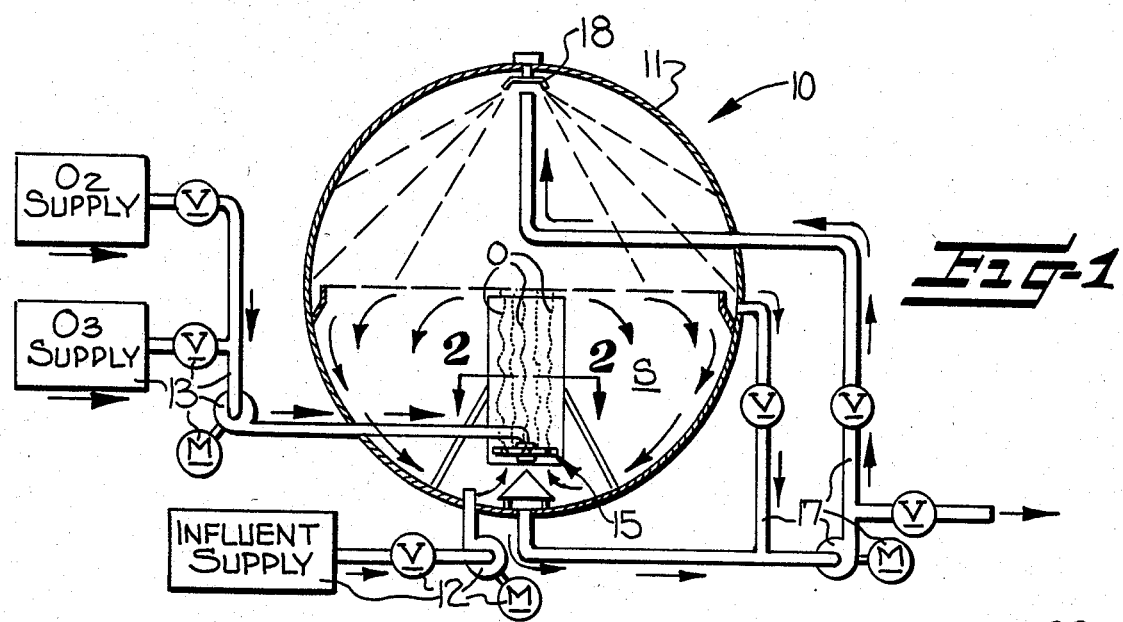
FIG. 1 is a schematic, diagramatic view of an apparatus for chemically treating liquid sewage containing sludge and including the improved diffuser tube assembly of this invention.

Referring now to the drawings, there is shown in FIG. 1 an apparatus, generally indicated at 10, for chemically treating liquid waste water or sewage S containing sludge. This apparatus 10 purifies the sludge through the use of ozone by a process which is now commercially known as "OXYOZOSYNTHESIS" and which turns sludge into a burnable residue in approximately ninety minutes.

Figure 2:
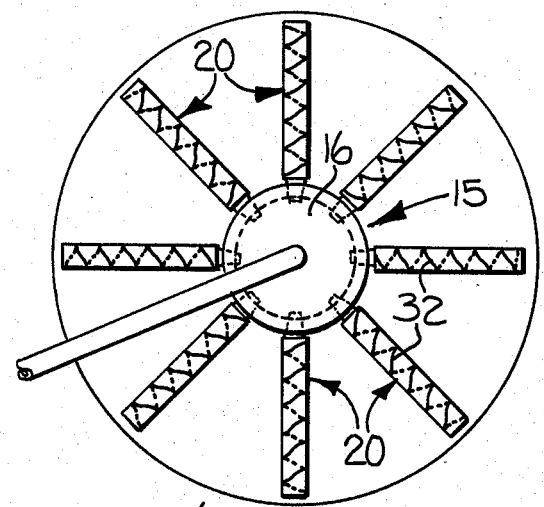
FIG. 2 is an enlarged sectional view, taken generally along the line 2—2 in FIG. 1.
Figure 3:
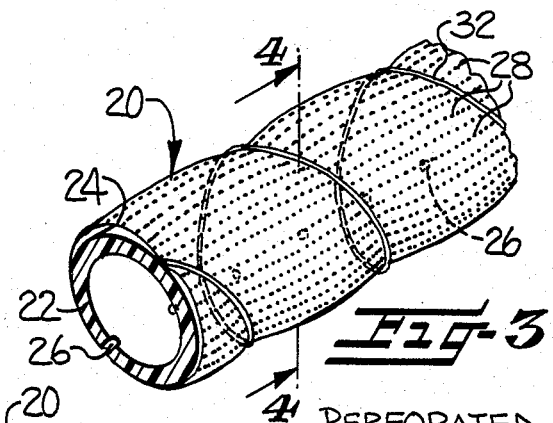
FIG. 3 is an enlarged partial perspective view of a portion of a diffuser tube assembly utilized in the apparatus of FIG. 1.
Figure 5:
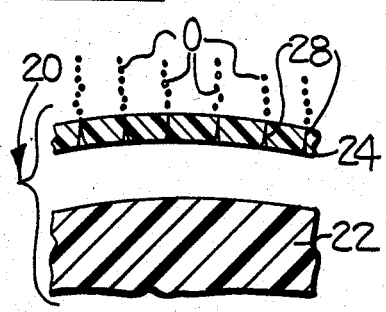
FIG. 5 is an enlarged sectional detail taken generally within the box 5 in FIG. 4.

The apparatus 10 includes a pressurized vessel 11 in the form of a closed steel tank. Liquid sewage S containing sludge is supplied to the pressurized vessel 11 by suitable devices indicated at 12. Oxygen gas O under pressure is supplied to the pressurized vessel 11 by suitable devices indicated at 13. The pressurized oxygen gas O is diffused into the liquid sewage S within the pressurized vessel 11 by a diffusing apparatus 15 which, as more fully illustrated in FIG. 2, includes a header 16 for receiving the oxygen gas O under pressure and a plurality of radially extending diffuser tube assemblies 20 extending outwardly from and radially around the header 16 for receiving the oxygen gas O from the header 16 and diffusing it into the liquid sewage S.

In accordance with the "OXYOZOSYNTHESIS" process, the vessel 11 is pressurized with oxygen gas O in the form of ozone by diffusing such oxygen gas O up through liquid sewage S in the lower portion of the pressurized vessel 11. Such oxygen gas O will rise to the top portion of the pressurized vessel 11 and create an oxygen atmosphere therein. Simultaneously, the liquid sewage S is pumped by suitable devices 17 from the bottom of the pressurized vessel 11 to the top thereof and into contact with a rotating comminutor device 18 so as to break the liquid sewage S up into myriad small particles to provide a substantial increase in the interface area between the liquid sewage S and the oxygen gas O so that the oxygen gas O may be readily absorbed as the liquid sewage particles S drop through the oxygen rich atmosphere in the upper portion of the pressurized vessel 11. In this process, it is also desirable that the greatest interface area be created between the oxygen gas O and the liquid sewage S as the oxygen gas O is diffused from the diffuser mechanism 15 up through the liquid sewage S in the bottom of the pressurized vessel 11. For that purpose, an improved diffuser tube assembly 20, constructed in accordance with this invention, is utilized in the treating apparatus 10.

Such improved diffuser assembly 20 in accordance with this invention comprises an enclosed elongate inner support tube 22 of a circular cross-sectional shape which may be constructed of a rigid or flexible plastic material. For purposes of use in the treating apparatus 10 and the diffuser apparatus 15, described above, the support tube 22 is preferably constructed of a rigid plastic polyvinyl chloride material. The support tube 22 receives oxygen gas O under pressure from the header 16 by virtue of an open end in communication therewith and includes an outer closed end. The support tube 22 is submerged in a generally horizontal position within the liquid sewage S in the pressurized vessel 11.

The diffuser tube assembly 20 further includes a flexible membrane sheath 24 of any suitable membrane material, well known to those with ordinary skill in the art, and which preferably is initially generally impervious to the oxygen gas O being diffused and the liquid sewage S into which the oxygen gas O is being diffused. The flexible membrane sheath is suitably positioned around and surrounds the entire outside of the support tube 22. Preferably, the membrane sheath 24 is bonded to the support tube 22 longitudinally along the support tube 22 at a lowermost circumferential area of the support tube 22, as indicated by the portion labeled "Bonded Area" in FIGS. 4 and 12.

The diffuser tube assembly 20 further includes apertures 26 extending radially through the support tube 22 and being located longitudinally along said support tube 22 in a lower section of said support tube below a horizontal plane passing through said support tube along the longitudinal axis thereof, as may be clearly seen in FIGS. 4 and 10, for passing oxygen gas O under pressure from within the support tube 22 into the interior of the flexible membrane sheath 24 to flow upwardly between the support tube 22 and the membrane sheath 24 while slightly stretching the membrane sheath 24 to allow such flow. The apertures are preferably disposed along two longitudinally extending lines and are staggered between lines.

Figure 4:
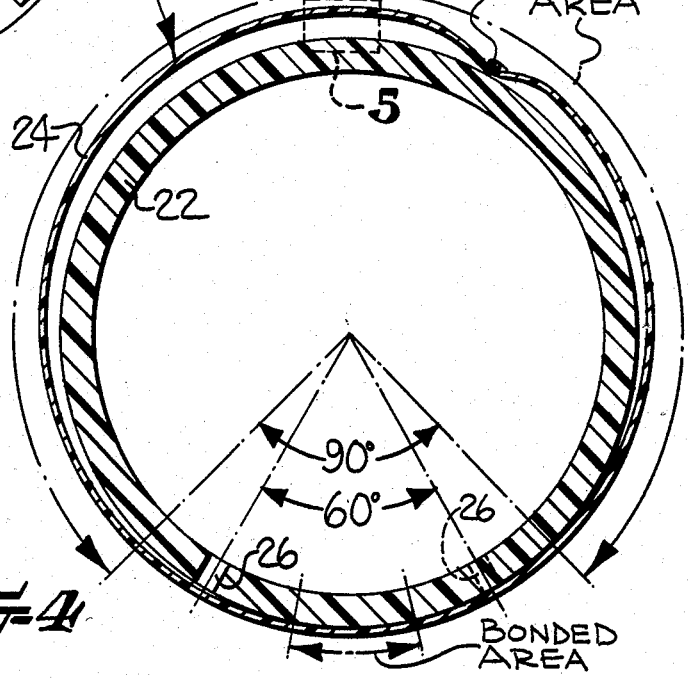
FIG. 4 is an enlarged sectional view through the diffuser tube assembly of FIG. 3 and taken generally along the line 4—4 of FIG. 3.

The diffuser tube assembly 20 further includes a plurality of minute punctures 28 extending through the membrane sheath 24 and being located longitudinally along the membrane sheath 24 in an upper section of the membrane sheath 24 above the apertures 26 in the support tube, as indicated by the portion labeled "Perforated Area" in FIGS. 4 and 12, for discharging the oxygen gas O under pressure out of the membrane sheath 24 and into the liquid sewage S.

By the above construction of the diffuser tube assemblies 20, fine streams of tiny bubbles of the oxygen gas O will be discharged into the liquid sewage S for diffusion, as schematically illustrated in FIG. 1. Also, the membrane sheaths 24 will seal the apertures 26 in the support tubes 22 against any backflow of liquid sewage S which might pass through the punctures 28 in the membrane sheaths 24 when oxygen gas is not being diffused or the pressure of the liquid sewage S is greater than that of the oxygen gas O. This sealing is performed by the membrane sheaths 24 sealing themselves like a valve against the outside of the apertures 26 in the support tubes 22. Since there are no punctures 28 in the membrane sheaths at the area of the apertures 26, such sealing of the apertures 26 by the membrane sheaths 24 will be preserved. Additionally, any nonrecoverable stretching which occurs in the membrane sheaths 24, as a result of the oxygen gas passing between the membrane sheaths 24 and the support tubes 22, will occur generally above the apertures 26 since the oxygen gas O will be rising after passing through the apertures 26. Furthermore, the location of the apertures 26 in the lowermost portions of the tube 22 makes effective use of the increased head or pressure at the locations of the apertures relative to the upper portions of the tube to thereby achieve a better seal between the membrane and the support tube 22.

To further enhance such sealing effect of the membrane sheath 24 with the apertures 26 in the support tube 22, shoulder portions 27, as illustrated particularly in FIG. 9, may be formed in the outside surface of the support tube 22 circumferentially around such apertures 26 to form a valve seat. The shoulder portions 27 may be suitably formed by a heated tool T in the manner illustrated diagramatically in FIG. 10.

The punctures 28 through the membrane sheath 24 in accordance with this invention are preferably needle punched from the inside of the membrane sheath 24 to the outside thereof, as illustrated diagramatically in FIG. 6, without removal of any material from the membrane sheath 24 and while slightly deforming the material of the membrane sheath 24 surrounding the punctures 28 from the inside to the outside of the membrane sheath 24. This construction aids in the passage of the oxygen gas O through the punctures 28 from the inside to the outside of the membrane sheath 24 and causes vibrations of the deformed material on the outside of the membrane sheath 24 during passage of the oxygen gas O through the punctures 28 to aid in preventing clogging of the punctures 28 by particles which might be present in the liquid sewage S. This arrangement also aids in preventing backflow of liquid sewage S into the diffuser tube assembly 20.

The needle punched punctures are also very tiny in cross-sectional area and create the smallest bubbles of oxygen gas O that would be operationally practical. To provide a sufficient number of bubbles and a sufficient amount of oxygen gas O into the liquid sewage S during the diffusing operation, it has been found that approximately 300 punctures per square inch of membrane sheath should be provided.

Preferably, the diffuser tube assembly 20 may include wires 32 spirally wound around the outside of the membrane sheath 24 to aid in preventing excessive "ballooning" of the membrane sheath 24 during the oxygen gas diffusing operation which is caused by the oxygen gas O under pressure pushing outwardly on the membrane sheath 24 as it rises to the top of the diffuser tube assembly 20 for discharge through the punctures 28.

For the diffuser tube assembly 20 to be utilized in the apparatus 10, it has been stated above that the support tube 22 would be preferably of a rigid plastic material so as to provide a rigid diffuser tube assembly. With this type of rigid diffuser tube assembly 20, it has been found preferable to locate the apertures 26 in the lowermost 90° circumferential section of the support tube 22 and to locate the punctures 28 within the remaining upper 270° circumferential section of the membrane sheath 24.

Referring now to FIGS. 11 and 12, a slightly modified gas diffuser tube assembly 20' is illustrated therein. However, this slightly modified gas diffuser tube assembly 20' includes many features in common with the gas diffuser tube 20 discussed above and like structural features are provided with like reference numerals and will not be further described.

This slightly modified gas diffuser tube assembly 20 may be used for insertion into existing liquid sewage conveying conduits or other conduits, such as discussed in applicant's prior U.S. Pat. No. 3,525,685. The support tube 22 of this diffuser tube assembly 20' would be constructed of a suitable flexible, rather than rigid, plastic material so that the entire diffuser tube assembly would be flexible for easy insertion into existing conduits or the like. There may also be provided weighted portions 35 for holding the diffuser tube assembly 20' submerged in liquid sewage S and may be in a suitable shape to hold the diffuser tube assembly 20' in a desired position.

Lastly, for this flexible type of diffuser tube assembly 20' it has been found preferable to locate the apertures 26 in the lowermost 180° circumferential section of the support tube 22 and the punctures 28 in the membrane sheath 24 in the upper 180° circumferential section of the membrane sheath 24, as illustrated particularly in FIG. 12.

Accordingly, as may be seen from the above descriptions, this invention has provided an improved gas diffuser tube assembly which will create an increased area of interface between the liquid and the gas by producing the smallest bubbles of gas that would be operationally practical and which is constructed to satisfactorily prevent backflow of liquid into the gas diffuser tube assembly. This improved gas diffuser tube assembly is particularly adaptable for use in an apparatus for chemically treating liquid sewage or waste water containing sludge for improving such chemical treatment.

In the drawings and specification, there have been set forth preferred embodiments of this invention and, although specific terms are employed, they are used in a generic and descriptive sense only and not for purposes of limitation.

What is claimed is:

1. A diffuser tube assembly for diffusing minute bubbles of a gas into a liquid, said diffuser tube assembly being particularly suited for diffusing bubbles of oxygen into liquid sewage for treatment thereof, and comprising:

an elongate support tube adapted for receiving the gas which is to be diffused;

a resilient flexible membrane sheath surrounding said support tube;

a plurality of apertures provided in said support tube and being located at spaced locations longitudinally therealong and on one side of a plane passing through said support tube along the longitudinal axis thereof, said apertures providing communication for the gas to flow from the interior of said support tube and into the interior of said flexible membrane sheath; and a plurality of minute punctures extending through said membrane sheath for discharging the gas under pressure out of said membrane sheath and into the liquid in the form of a multiplicity of minute bubbles, said punctures being so located in the sheath as to form a perforated area extending over a portion of the circumferential extent of the sheath and longitudinally therealong and an unperforated area located on said one side of said plane and opposite said apertures in said support tube, the unperforated area of said membrane sheath normally lying in contacting relation which said apertures so as to form a seal against back flow of liquid into said support tube when the pressure of the gas within the support tube is lowered, and said membrane sheath being stretched and distended when the pressure of the gas within the support tube is increased so as to move the unperforated area of the sheath out of contact with the apertures to allow the gas to flow through said aperture and into the space between the outside of the support tube and said membrane sheath for passing through the perforations in the sheath.

2. A gas diffuser tube assembly, as set forth in claim 1, in which said minute punctures in said membrane sheath are needle punctured from the inside thereof to the outside thereof without removal of any material therefrom while slightly deforming the material surrounding said punctures from the inside to the outside thereof to aid in passage of the gas therethrough and to cause vibrations of the deformed material on the outside thereof during passage of the gas through said punctures to aid in preventing clogging of said punctures by particles which may be present in the liquid.

3. A gas diffuser tube assembly, as set forth in claim 1, in which said punctures comprise approximately 300 punctures per square inch of said membrane sheath.

4. A gas diffuser tube assembly, as set forth in claim 1, in which said membrane sheath is bonded to said support tube longitudinally along said support tube at a lowermost circumferential area of said support tube.

5. A gas diffuser tube assembly, as set forth in claim 1 or 2, in which said apertures through said support tube include shoulder portions formed in the outside surface of said support tube circumferentially around said aperture for forming a valve seat to aid in sealing of said apertures by said membrane when gas is not being passed through said apertures.

6. A gas diffuser tube assembly, as set forth in claim 1 or 2, in which said support tube comprises rigid plastic material for providing additional support to said diffuser tube assembly.

7. A gas diffuser tube assembly, as set forth in claim 6, in which said diffuser tube assembly further comprises wire means spirally wound around the outside of said membrane sheath to aid in preventing excessive ballooning of said membrane sheath during the gas diffusing operation.

8. A gas diffuser tube assembly, as set forth in claim 6, in which said apertures are located within the lowermost 90° circumferential section of said support tube and said punctures are located within the remaining upper 270° circumferential section of said membrane sheath.

9. A gas diffuser tube assembly, as set forth in claim 1 or 2, in which said support tube comprises flexible plastic material for providing flexibility and allowing said diffuser tube assembly to be fed and laid into existing conduits and the like.

10. A gas diffuser tube assembly, as set forth in claim 9, in which said apertures are located and within the lowermost 180° circumferential section of said support tube and said punctures are located within the upper 180° circumferential section of said membrane sheath.

11. A gas diffuser tube assembly, as set forth in claim 9, in which said tube assembly further includes weight means attached to the lower section of said assembly for holding said assembly in a submerged position in the liquid into which the gas is to be diffused.

12. An apparatus for chemically treating liquid sewage or waste water containing sludge and including an enclosed pressurized vessel, means for supplying liquid sewage containing sludge to said pressurized vessel, means for supplying oxygen gas under pressure to said pressurized vessel, and means for diffusing the oxygen gas into the liquid sewage within said pressurized vessel; the improvement wherein said means for diffusing oxygen gas includes at least one gas diffuser tube assembly comprising:

an elongate support tube adapted for receiving the gas which is to be diffused;

a resilient flexible membrane sheath surrounding said support tube;

a plurality of apertures provided in said support tube and being located at spaced locations longitudinally therealong and on one side of a plane passing through said support tube along the longitudinal axis thereof, said apertrues providing communication for the gas to flow from the interior of said support tube and into the interior of said flexible membrane sheath; and a plurality of minute punctures extending through said membrane sheath for discharging the gas under pressure out of said membrane sheath and into the liquid in the form of a multiplicity of minute bubbles, said punctures being so located in the sheath as to form a perforated area extending over a portion of the circumferential extent of the sheath and longitudinally therealong and an unperforated area located on said one side of said plane and opposite said apertures in said support tube, the unperforated area of said membrane sheath normally lying in contacting relation which said apertures so as to form a seal against back flow of liquid into said support tube when the pressure of the gas within the support tube is lowered, and said membrane sheath being stretched and distended when the pressure of the gas within the support tube is increased so as to move the unperforated area of the sheath out of contact with the apertures to allow the gas to flow through said aperture and into the space between the outside of the support tube and said membrane sheath for passing through the perforations in the sheath.

13. In an apparatus, as set forth in claim 12, in which said punctures comprise approximately 300 punctures per square inch of said membrane sheath, and in which apertures are located within the lowermost 90° circumferential section of said support tube and said punctures are located within the remaining upper 270° circumferential section of said membrane sheath.

14. In an apparatus, as set forth in claim 12, in which said diffuser tube assembly further includes wire means spirally wound around the outside of said membrane sheath to aid in preventing excessive ballooning of said membrane sheath during the oxygen gas diffusing operation, and in which said apertures through said support tube include shoulder portions formed in the outside surface of said support tube circumferentially around said apertures for forming valve seats to aid in sealing of said apertures by said membrane sheath when oxygen gas is not being passed through said apertures.

* * * * *